United States Patent [19]

Lura

[11] 4,178,028
[45] Dec. 11, 1979

[54] ENERGY ABSORBING MOUNTING FOR VEHICLE BUMPER

[75] Inventor: Loren E. Lura, Sandusky, Ohio

[73] Assignee: General Motors Corporation, Detroit, Mich.

[21] Appl. No.: 856,592

[22] Filed: Dec. 1, 1977

[51] Int. Cl.² ............................................. B60R 19/00
[52] U.S. Cl. ..................................... 293/135; 293/155
[58] Field of Search ....................... 293/85, 73, 86, 74, 293/87, 70, 88, 60, 89, DIG. 5, 84, 68, 80–81, 72, 99–101, 102, 104, 132–137, 154–155; 267/140, 139, 69, 30, 42, 44, 45

[56] References Cited

U.S. PATENT DOCUMENTS

| | | | |
|---|---|---|---|
| 1,290,187 | 1/1919 | Helman et al. | 293/84 |
| 1,565,587 | 12/1925 | Parsons | 293/81 |
| 2,058,283 | 10/1936 | Wolff | 293/84 |
| 3,694,019 | 9/1972 | Carter | 293/88 X |
| 4,046,411 | 9/1977 | Richard, Jr. | 293/88 |

Primary Examiner—Douglas C. Butler
Attorney, Agent, or Firm—Charles R. White

[57] ABSTRACT

This energy absorber yieldably couples a bumper to support structure on a vehicle and comprises a spring bracket assembly which includes a pair of diverging spring arms which carry pins on the ends thereof. A preloaded yieldable energy absorbing band of resilient plastic material is stretched across the arms, by attachment to the spaced pins. On impact of the bumper, the pins are displaced outwardly from one another as the spring arms are deflected to stretch the energy absorbing band. The deflection of the spring arms and the stretching of the energy absorber absorbs impact energy.

3 Claims, 3 Drawing Figures

ENERGY ABSORBING MOUNTING FOR VEHICLE BUMPER

This invention relates to a new and improved energy absorbing unit having a mounting bracket yieldably coupling relatively movable vehicle components which additionally support and stretch a resilient energy absorber on relative movement of the components to absorb kinetic energy thereof.

Prior to the present invention, a wide variety of energy absorber units have been utilized to yieldably mount a rigid, transversely extending bumper to the frame or unibody construction of a vehicle for absorbing impact energy moving the bumper relative to its support. Some of these units comprise telescoping inner and outer members which are movable from an extended position to a telescoped and collapsed position on bumper impact of predetermined magnitudes. These energy absorber units often employ viscous fluids, spring devices or stretchable bands for dissipating the energy of such impacts. While the prior energy absorbing devices have adequately performed to absorb impact energy, they are often costly, bulky, complex in construction and have added considerable weight to the vehicle.

The present invention is drawn to a new and improved lightweight and economical energy absorbing unit having a minimal number of parts, which is comprised of a bracket having a pair of spring arms diverging outwardly from a base connected to a support on a vehicle. A band of resilient plastic energy-absorbing material is connected to opposed extremities of the spring arms by pins or other suitable fasteners. A second spring bracket or other suitable connection couples the ends of the spring arms to a movable bumper or other relatively movable component. On impact, the bumper moves inward relative to the vehicle body to simultaneously flex the spring arms and stretch the band which will absorb impact energy. After impact, the spring arms return the bumper to its outer pre-impact location relative to the vehicle body. The band, having a low recovery rate, does not add to the rebound force of the spring arms returning the bumper to its outer position. After the bumper is repositioned, the band recovers to its original position so that it is ready for additional energy absorption.

The band or belt forming the energy absorber is preferably of an oriented plastic material which can be tailored to suit the various energy absorbing requirements by increasing or decreasing the thickness of the band or, in the case of a multi-wrap band, by varying the number of wraps of the material which form the band. Such bands have a long service life and provide a new medium for effective, low cost, lightweight energy absorbers.

It is a feature, object and advantage of this invention to provide a new and improved energy absorbing unit operatively connecting relatively movable members comprising an elongated energy absorber of resilient material which is supported and stretched by a pair of diverging and movable arms to absorb input energy causing the movement of the arms.

It is another feature, object and advantage of this invention to provide a new and improved energy absorbing unit which is particularly adaptable for supporting vehicle bumpers or the like, which incorporates a minimal number of components, which is lightweight and highly effective in absorbing input energy on the stretching of a resilient energy absorbing band that is preloaded between spring arm members operatively connected between the bumper and a support on a vehicle in a manner such that the spring arms and the band are simultaneously deflected in response to an impact load moving the bumper relative to the vehicle body.

It is another feature, object and advantage of this invention to provide a new and improved energy absorbing unit which connects a bumper to a support structure incorporating a pair of resilient spring arms that carry a laterally extending band of resilient oriented plastic material that is stretched in response to flexure of the arms on bumper impact so that the impact energy is absorbed.

These and other features, objects and advantages of this invention will be more apparent from the following detailed description and drawings in which.

Figure 1:
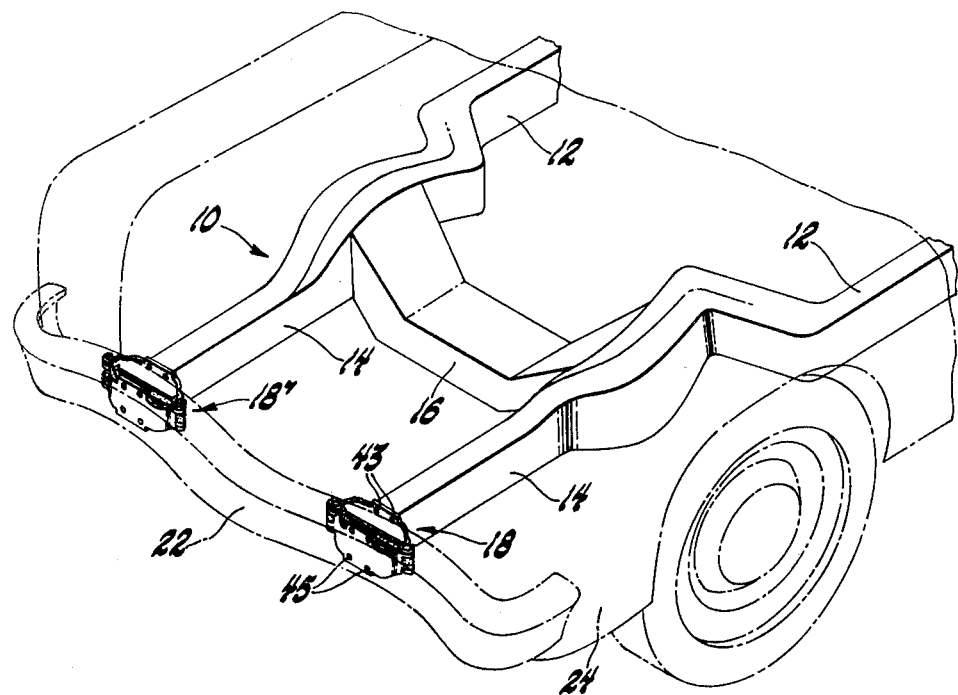
FIG. 1 is a perspective view of a portion of an automotive vehicle chassis frame and a pair of energy absorber units mounting a bumper assembly to the frame.

Referring now to FIG. 1 of the drawings, there is shown a portion of a vehicle chassis frame 10 comprising a pair of laterally spaced side rails 12 having forwardly extending front portions 14 interconnected by a cross member 16. Secured by bolts or other suitable fasteners to the ends of the front portions 14 of the frame are a pair of energy absorbing units 18 and 18' that yieldably support a bumper assembly 22 outwardly of the body work 24 of the vehicle. Since both of the units 18 and 18' are the same in construction, only one is described in detail.

Figure 2:
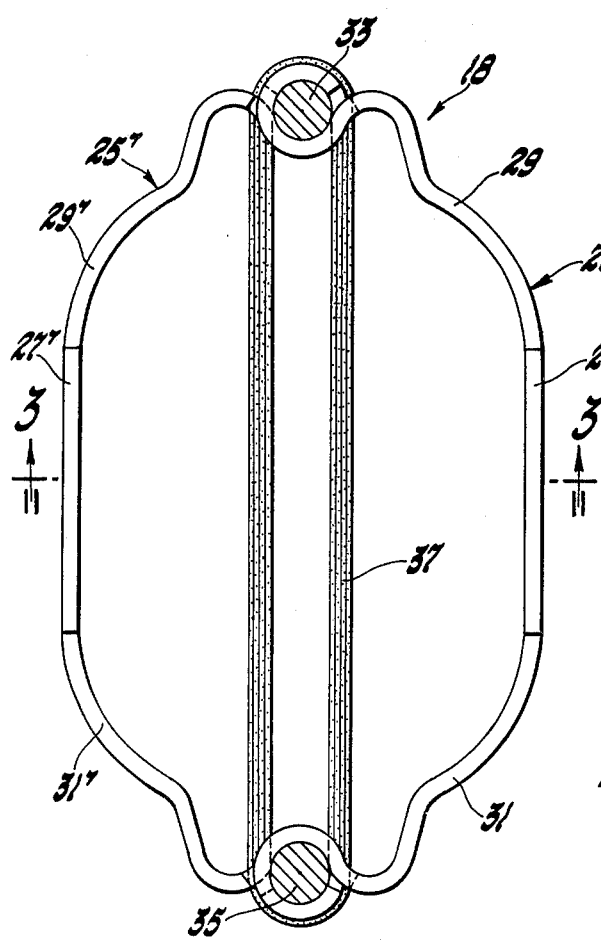
FIG. 2 is a top view showing one of the energy absorber units of FIG. 1 in a normal position to hold the bumper assembly outwardly of the vehicle frame.
Figure 3:
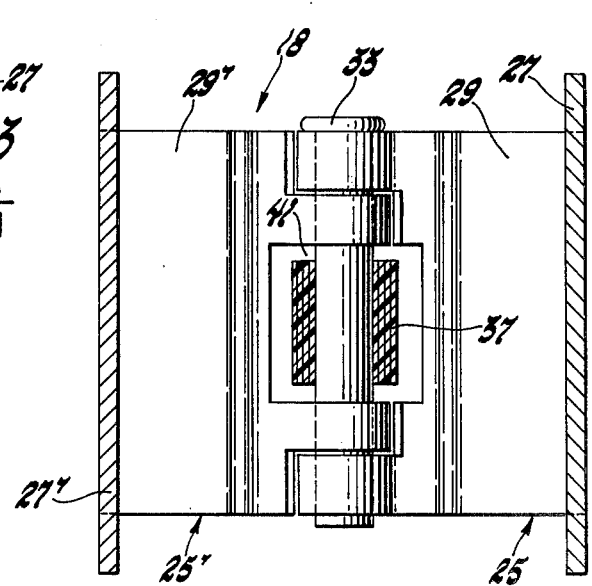
FIG. 3 is a sectional view taken along the plane indicated by line 3—3 of FIG. 2.

As shown, the energy absorbing unit 18, in its preferred form, comprises a pair of spring brackets 25 and 25' connected to each other to form a generally elliptical spring unit yieldably coupling the ends of the vehicle frame to the bumper assembly 22. Each spring bracket has an attachment base 27 or 27' and a pair of spring arms 29, 31 or 29', 31' diverging therefrom. The extremities of each arm are barreled and mate as shown in FIGS. 2 and 3 to receive vertical hinge pins 33 and 35.

Stretched and preloaded between pins 33 and 35, is a suitable energy absorber 37 which is made of an oriented plastic material which can be further stretched to absorb impact energy and which has good memory and low recovery rate to return to its original preloaded position. The energy absorber may be either a thick band which is looped around the pins or a multi-wrapped band of thin material which is wound around the pins 33 and 35 that extends through suitable openings in the ends of the spring arms such as shown at 41 in FIG. 3. The energy absorber band may be the same as that of U.S. Pat. No. 4,046,411 issued to Raymond L. Richard hereby incorporated by reference.

The bracket 25 is fastened to the end of the side rail 12 by threaded fasteners 43 while bracket 25' is coupled to the bumper assembly 22 by threaded fasteners 45. With this bracket construction and the preloaded band, the bumper assembly is yieldably positioned outwardly of the body work of the vehicle to prevent damage thereto.

On impact of the bumper assembly by an impact load greater than a predetermined magnitude, the bumper assembly and the vehicle body relatively move toward each other. On this movement, the spring arms of the brackets 25 and 25' will be flexed toward one another causing the general lateral movement of the pins 33 and 35 away from each other. This pin action stretches the oriented plastic band 37. The flexure of the spring arms plus the stretching of the band 37 will absorb the kinetic energy of the relatively moving bumper assembly and frame. Since most such impacts are low speed impacts, the bumper assembly will not be cramped into the body work to cause damage thereto.

After removal of the impact load, the spring arms of the two brackets will return the bumper assembly to the outward position. The force of recovery of the energy absorbing unit exerted to return the bumper beam to its outer position is less than the energy stored in the deflected spring brackets and the energy absorber 37 since energy absorber 37 has a slower rate of recovery than the spring brackets. After the spring arms move the bumper back to the outer position, the plastic energy absorber, having a lower rate of recovery, will subsequently return to its preloaded position.

While this invention has been described in connection with vehicle bumpers, it could be readily employed for suspensions and other similar vehicle uses. It will be appreciated that various modifications and embodiments of the construction could be made in view of this description and without departing from the disclosure or the scope of the following claims.

I claim:

1. An energy absorber unit yieldably coupling relatively movable first and second components of a vehicle to one another comprising bracket means operatively connecting said components to one another, said bracket means having a pair of deflectable spring arms of resilient spring metal diverging in opposite directions from one another, an elongated energy absorber of resilient plastic material, first fastener means securing one end portion of said energy absorber to the extremity of one of said arms, second fastener means securing the other end portion of said energy absorber to the extremity of the other of said arms, connector means operatively connecting said bracket means to said relatively movable first and second components of the vehicle so that impact causing relative movement of said components from a pre-impact position toward each other causes said arms to resiliently deflect from one another and increase the spacing between said first and second fastener means to thereby stretch said energy absorber and so that said energy absorber dissipates the kinetic energy of said components as said components are relatively moved, said plastic energy absorber having a recovery rate lower than the recovery rate of said spring arms to permit said spring arms to return said components to said pre-impact position without added recovery force from said energy absorber.

2. An energy absorber unit yieldably coupling relatively movable first and second components of a vehicle to one another comprising a bracket having a base and a pair of spring arms of resilient metal diverging outwardly therefrom, an energy absorber extending laterally between said arms, said energy absorber being a multiple wrap band of oriented plastic material, first fastener means securing one end of said energy absorber to the extremity of one of said arms, second fastener means securing the other end of said energy absorber to the extremity of the other of said arms so that said energy absorber is stretched and preloaded across said bracket, connector means securing said bracket to said relatively movable first and second components of said vehicle so that an impact load causing relative movement of said components from a pre-impact position toward each other causes said arms to deflect and increase the spacing between said fastener means to thereby stretch said energy absorber which cooperates with said resilient spring arms to dissipate kinetic energy of the relatively movable components of said vehicle, said plastic energy absorber having a recovery rate lower than the recovery rate of said spring arms to permit said spring arms to return said components to said pre-impact position without utilization of the recovery force of said energy absorber.

3. An energy absorber unit yieldably coupling a movable bumper assembly to bumper assembly support structure of an automotive vehicle comprising first and second spring members, each of said spring members having a central base portion and a pair of resilient spring arms extending in opposite directions and diverging from said central base portion, an elongated looped energy absorber of oriented plastic material, first and second fastener means securing the ends of said spring arms of said first spring member to the corresponding ends of said spring arms of said second spring member so that said spring members cooperate to form a closed loop spring with the extremities thereof spaced laterally from one another, said energy absorber being preloaded between said fastener means, connector means securing said spring members to said bumper assembly and said bumper assembly support structure of said vehicle so that impact loads causing movement of said bumper assembly from a pre-impact position disposed outwardly from said support structure toward said support structure causes said spring arms to flex and increase the spacing between said fastener means to thereby stretch said energy absorber so that said spring arms and said energy absorber cooperate to dissipate the kinetic energy of the relatively movable bumper assembly, said plastic energy absorber having a recovery rate lower than the recovery rate of said spring arms to permit the spring arms to return said bumper assembly to a pre-impact position without added recovery force from said plastic energy absorber.

* * * * *